大专利 Office

2,909,548
COPOLYMERS OF MONO-VINYL METHYL SILOXANES AND CHLOROTRIFLUOROETHYLENE

Donald L. Bailey, Snyder, and Ronald M. Pike, Grand Island, N.Y., assignors to Union Carbide Corporation, a corporation of New York No Drawing. Application March 27, 1956
Serial No. 574,106

21 Claims. (Cl. 260—448.2)

This invention relates to polysiloxanes. More particularly, this invention is directed to copolymers of mono-vinyl siloxanes and chlorotrifluoroethylene as new compositions of matter and to a process for producing the same.

Copolymers of unsaturated organic compounds and a number of unsaturated silicon-containing compounds have been suggested. For the most part those suggestions involve the copolymerization of an unsaturated organic compound with either a simple olefinic silane or a polysiloxane containing a plurality of unsaturated groups. Copolymers of the above type are characterized by their stability against decomposition at elevated temperatures and thus have advantages over those polymers or copolymers derived from purely organic materials. However, such copolymers have not met with wide acceptance as they are not suitable for a wide variety of applications. By way of illustration, difficulty is encountered in obtaining a silicone copolymer in a soluble form so that a solution of it can be applied to a surface and the solvent evaporated to form a coating of the copolymer on the surface.

The present invention is based on our discovery that thermally stable silicon-containing copolymers, which are soluble in various liquid organic compounds, can be produced by copolymerizing a mono-vinyl siloxane with a halogen-substituted vinyl compound. More specifically, we have found that useful copolymers can be produced by copolymerizing a mono-vinyl methylsiloxane with chlorotrifluoroethylene.

The copolymers of our invention can be produced by forming a mixture of a mono-vinyl methylsiloxane and chlorotrifluoroethylene and heating the mixture in the presence of a catalyst to a temperature sufficiently elevated to cause the starting materials to react to produce the copolymer.

The mono-vinyl methylsiloxanes which we prefer to employ as one of the starting materials in our process can be graphically represented by the formula:

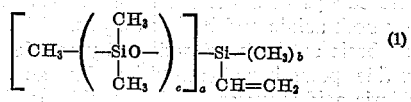

wherein $a$, $b$ and $c$ are integers with $a$ having a value of from 1 to 3, $b$ having a value of from 0 to 2, $c$ having a value of from 1 to 6, with the sum of $a$ and $b$ being equal to 3, the product of $a$ and $c$ having a value of from 1 to 6 and there are up to 7 silicon atoms in the molecule. Illustrative of these mono-vinyl methylsiloxanes are: tris(trimethylsiloxy)vinylsilane, bis(trimethylsiloxy)methylvinylsilane, trimethylsiloxydimethylvinylsilane, and the like.

Our preferred mono-vinyl methylsiloxane starting materials can be produced by heating a mixture of a methylsiloxy substituted silane which contains only one hydrogen atom bonded directly to silicon, acetylene and a catalyst to a temperature sufficiently elevated to cause the starting materials to react to produce a mono-vinyl methylsiloxane. By way of illustration, bis(trimethylsiloxy)methylvinylsilane is produced by heating bis(trimethylsiloxy)methylsilane with acetylene in the presence of platinum as catalyst to a temperature sufficiently elevated to cause the acetylene and substituted silane to react. Processes for producing monovinyl methylsiloxanes useful as starting materials in the present invention are described and claimed in the abandoned copending United States patent applications Serial Nos. 574,104 and 574,087.

Our preferred mono-vinyl methylsiloxane starting materials are linear compounds such as correspond to graphical Formula 1 above. However, mono-vinyl cyclic methylsiloxanes are also useful in producing our copolymers. Thus we may copolymerize chlorotrifluoroethylene with such mono-vinyl cyclic methylsiloxanes as vinylpentamethylcyclotrisiloxane, vinylheptamethylcyclotetrasiloxane, vinylnonamethylcyclopentasiloxane and the like according to the process of our invention to produce our copolymers.

The polymerization temperatures which we can employ in our process are not narrowly critical and can vary over a wide range. We can employ temperatures as low as 30° C. and as high as 150° C. and above; however, we prefer to employ a temperature of from about 50° C. to about 80° C. Temperatures above and below the suggested ranges can also be employed; however, no commensurate advantage is obtained thereby.

As catalysts for our process, we can employ any of the compounds employed in vinyl-type polymerization reactions. By way of illustration we can employ organic peroxides such as the alkyl and aryl peroxides including tertiary butyl peroxide, benzoyl peroxide and the like; organic azo compounds such as alpha,alpha'-azodiisobutyronitrile and the like; and ultra-violet light.

The amount of catalyst employed in our process is not narrowly critical. We can employ the catalyst in amounts of from as little as about 0.02 percent up to about 2.5 percent by weight of the starting materials. However, we prefer to employ the catalyst in an amount of from about 0.5 to about 1.5 percent by weight of the starting materials. Amounts of the catalyst outside of the wider range disclosed above can also be employed; however, no commensurate advantage is obtained thereby.

One way of carrying out the copolymerization of the mono-vinyl methylsiloxane and chlorotrifluoroethylene is to charge these starting compounds together with a catalyst into a closed vessel and to heat the resulting mixture to the temperature at which they will react to produce the copolymer. If desired, the reaction can be conducted in an inert atmosphere to minimize undesirable side reactions and/or inhibition of the reaction due to atmospheric oxygen. Protection of the reactants can be accomplished by adding the starting materials and catalyst to a closed vessel and charging an inert gas such as argon, nitrogen or the like thereto.

To obtain good reactive contact between the molecules of the starting materials we can carry out our process by first dissolving the mono-vinyl methylsiloxane and chlorotrifluoroethylene in a suitable liquid organic compound, preferably one in which the reactants are completely soluble, adding the catalyst to the solution and heating the mixture to a temperature at which reaction occurs. Illustrative of the liquid organic compounds in which the starting materials of our process are completely soluble are the aromatic hydrocarbons such as toluene, xylene and the like. The amount of the liquid organic compound employed is not narrowly critical. In our work we have found that an amount of the liquid organic compound equal in weight to the combined weight of the reactants can be employed with good results. Our process can be also carried out by adding the starting materials to a liquid organic compound or aqueous admixture in which they are not soluble, but in which they can be finely dispersed as in the form of an emulsion, adding the catalyst and heating the mixture to the reaction temperature.

The mono-vinyl methylsiloxane and chlorotrifluoroethylene starting materials can be employed in our process in varying amounts depending upon the desired content of combined mono-vinyl methylsiloxane or combined chlorotrifluoroethylene in the copolymer. Thus, amounts of the mono-vinyl methylsiloxane of from as little as about 1 percent to as high as about 99 percent by weight and amounts of chlorotrifluoroethylene of from about 99 percent to about 1 percent by weight of the total weight of the reactants can be employed. We prefer to employ the mono-vinyl methylsiloxane in an amount of from about 5 percent to about 90 percent by weight and chlorotrifluoroethylene in an amount of from about 95 percent to about 10 percent by weight of the total weight of the reactants.

We have found that the higher the initial concentration of the starting mono-vinyl methylsiloxane in the reaction mixture, up to a maximum value of about 25 percent by weight of the total weight of the reactants, the faster the rate at which the copolymerization proceeds. On the other hand, with initial concentrations of the starting mono-vinyl siloxane in the reaction mixture above about 25 percent by weight of the total weight of the reactants the rate of the copolymerization reaction decreases. According to our experience with other systems wherein an unsaturated organic compound and an unsaturated organic silicon-containing compound are copolymerized, the rate at which copolymerization proceeds decreases as the concentration of the unsaturated organic silicon-containing compound in the initial reaction mixture increases. Apparently the reactants in our process are characterized by properties which have an unusual effect on the rate at which our copolymerization reaction proceeds, such properties appearing to have their most beneficial effect on the rate of reaction when employed in amounts of from about 1 to about 60 percent by weight of the mono-vinyl methyl-siloxane of the total weight of the reactants and from about 99 percent to about 40 percent by weight of the chlorotrifluoroethylene of the total weight of the reactants.

Starting with given amounts of the reactants, the composition of the copolymer resulting from our process can be approximately determined by the equation appearing below, developed by T. Alfrey, Jr., J. Bohrer and H. Mark, appearing in the text "High Polymers," volume VIII, "Copolymerization" published by Interscience Publishers, Inc., New York, New York, 1952, which relates monomer and polymer compositions with the reactivities of the monomers involved.

$$\frac{m_1}{m_2} = \frac{M_1}{M_2} \frac{r_1 M_1 + M_2}{r_2 M_2 + M_1}$$

where:

$M_1$ and $M_2$ are mole fractions of monomer in the monomer mixture.

$m_1$ and $m_2$ are mole fractions of monomer in the copolymer.

$r_1$ and $r_2$ are reactivity ratios which relate the relative rates of the propagation reactions involved.

The reactivity ratios $r_1$ and $r_2$ can be further defined by $$r_1 = \frac{k_{11}}{k_{12}} \text{ and } r_2 = \frac{k_{22}}{k_{21}}$$

where:

$k_{11}$ and $k_{12}$ are rate constants for reaction of $M_1$ with growing polymer radicals terminated with $m_1$ and $m_2$, respectively.

$k_{21}$ and $k_{22}$ are rate constants for reaction of $M_2$ with growing polymer radicals terminated with $m_1$ and $m_2$, respectively.

In our system the mono-vinyl methylsiloxane is relatively more reactive than our starting chlorotrifluoroethylene, the former compound having a reactivity ratio of about 0.20 as compared with a reactivity ratio of about 0.05 for chlorotrifluoroethylene. Equal amounts by weight of chlorotrifluoroethylene and a mono-vinyl methylsiloxane copolymerized in accordance with our process yield a copolymer which contains a smaller amount by weight of the combined chlorotrifluoroethylene than of the combined mono-vinyl methylsiloxane. The relative amount of the combined chlorotrifluoroethylene in the copolymer can be increased by increasing the concentration of the chlorotrifluoroethylene in the reaction mixture and in this manner the lower reactivity of the chlorotrifluoroethylene can be compensated for. Conversely the relative amount of combined mono-vinyl methylsiloxane in the copolymer can be increased beyond the relative amount present when equal quantities of reactants are used by using a higher concentration of the mono-vinyl methylsiloxane monomer in the reaction mixture. However, as indicated above, an increased initial concentration of the mono-vinyl methylsiloxane compound over and above 25 percent by weight of the reaction mixture decreases the rate of the reaction.

One method of increasing the siloxane content of the copolymers of our invention, other than by employing large amounts of our mono-vinyl methylsiloxanes in the initial reaction mixture, includes the steps of producing a copolymer from our starting materials under conditions which insure a rapid rate of reaction and subsequently equilibrating the copolymer with a methylpolysiloxane. Such equilibration reactions can be caused to take place between or among compounds containing silicon to oxygen to silicon linkages and are carried out by heating the compounds, in the presence of an acidic or basic catalyst, to a temperature at which the reaction will occur. By way of illustration, a copolymer of tris(trimethylsiloxy)vinylsilane and chlorotrifluoroethylene containing 4.3 percent by weight of the combined tris(trimethylsiloxy)vinylsilane can have its siloxane content increased to 95.12 percent by weight by equilibrating the polymer with octamethylcyclotetrasiloxane. There results or is produced by such equilibration reactions a copolymer having a structure similar to that of the initial copolymer with the exception that the pendant siloxane groups have additional methylsiloxy units.

Illustrative of the methylpolysiloxanes which can be equilibrated with the copolymers of our invention to increase the siloxane content thereof are such compounds having more than two consecutive silicon to oxygen to silicon bonds as hexamethylcyclotrisiloxane, octamethylcyclotetrasiloxane, octamethyltrisiloxane, dimethylpolysiloxanes and the like.

As catalysts for the equilibration reaction we can employ both acidic and basic catalysts. Illustrative of suitable basic catalysts are sodium hydroxide, potassium hydroxide, potassium dimethylsilanolate and the like, while sulfuric acid is typical of the suitable acidic catalysts.

In carrying out the equilibration reaction, the starting mono-vinyl methylsiloxane - chlorotrifluoroethylene copolymer and methylpolysiloxane are preferably added to a suitable liquid organic compound in which they are completely soluble. Suitable liquid organic compounds in which the starting materials are completely soluble are the aromatic hydrocarbons such as toluene, xylene and the like.

The copolymers of our invention can be regarded as molecules having long carbon chains with pendant halogen and hydrogen atoms and methylsiloxane groups. Such copolymers can have a structure of alternating combined mono - vinyl methylsiloxane - chlorotrifluoroethylene units, which when the mono-vinyl methylsiloxane is tris(trimethylsiloxy)vinylsilane can be graphically represented by the unit:

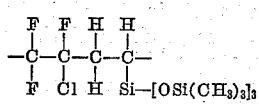

or the copolymers can comprise constituent molecules having alternating blocks of two or more combined chlorotrifluoroethylene units linked to blocks of two or more combined tris(trimethylsiloxy)vinylsilane units as graphically represented by the formula:

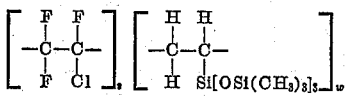

or they can comprise molecules having a structure including both types of units disclosed above which can be graphically represented by the formula:

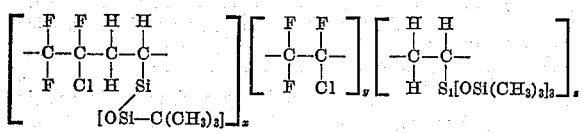

where $v$, $w$, $x$, $y$ and $z$ are integers.

Our preferred copolymers contain from about 1 percent to about 90 percent by weight of combined monovinyl siloxane. Such polymers are particularly useful as coatings especially in those applications where thermal stability is required. They can also be employed as sizes for fibrous glass materials. One property that our copolymers possess which makes them particularly suitable for their above uses is that they are soluble in a variety of liquid organic compounds such as benzene, isopropyl alcohol, chloroform and the like. Thus, solutions thereof can be readily prepared and the polymers applied by means of a spray.

The coplymers of our invention can also be employed as additives for lubricants. In this latter connection it has been found that our copolymers that contain more than 70 percent by weight combined mono-vinyl siloxane can be dissolved in dimethylpolysiloxane oil. The oils so modified possess excellent load carrying properties as compared to the normally poor load carrying properties of pure dimethylpolysiloxane oils. Other uses of our copolymers are as plasticizers, insulators and adhesives.

The following examples are illustrative of our invention:

EXAMPLE I

In a 12 inch Pyrex tube, cooled in a Dry Ice-acetone bath and previously flushed with argon, were placed tris(trimethylsiloxy)vinylsilane (3.0 grams), freshly condensed chlorotrifluoroethylene (8.5 grams), acetyl peroxide (1.0 grams as a 25% solution in dimethylphthalate) and benzene (10 cc.). The tube was sealed under argon and rotated in a water bath at 60°±2° C. for a period of 6.0 hours. Polymerization occurred as evidenced by an increase in viscosity. The reaction product was poured into a mixture of isopropyl alcohol (250 cc.) and water (25 cc.). The chlorotrifluoroethylene-tris(trimethylsiloxy)vinylsilane copolymer precipitated from the solution, was removed by filtration and dried in a constant temperature oven for a period of 16 hours. Analysis showed that the dried copolymer contained 22.5 percent by weight silicon, corresponding to 63.9 percent by weight siloxane. This analysis together with rate of polymerization curves and calculated reactivity ratios proved that copolymerization occurred. Similar runs were carried out using 8.35%, 19.1%, 26.1%, 47.6%, 77.9% and 94.9% by weight of tris(trimethylsiloxy)vinylsilane in the reaction mixture. The results shown below were obtained:

*Chlorotrifluoroethylene-tris(trimethylsiloxy) vinylsilane*

| Run | Percent by weight of tris(trimethylsiloxy)vinylsilane in reaction mixture | Percent by weight of combined tris(trimethylsiloxy)-vinylsilane in copolymer | M.P.(° C.) |
|---|---|---|---|
| 1 | 8.35 | 47.80 | |
| 2 | 19.10 | 59.00 | 160 |
| 3 | 26.1 | 62.90 | 140 |
| 4 | 47.6 | 71.40 | 150 |
| 5 | 77.9 | 78.00 | 121 |
| 6 | 94.9 | 83.60 | 81 |

These copolymers were all soluble in benzene and isopropyl alcohol. The copolymers containing over 70% by weight siloxane were soluble in a dimethylpolysiloxane oil. (0.2 g./1.0 g.) that has a viscosity of 200 centistokes.

A chlorotrifluoroethylene homopolymer produced under these conditions had a melting point of 200° C., and was incompatible with a dimethylpolysiloxane oil that had a viscosity of 200 centistokes.

EXAMPLE II

Following a procedure similar to that described in Example I, copolymers of bis(trimethylsiloxy)methylvinylsilane and chlorotrifluoroethylene were prepared as shown below:

*Chlorotrifluoroethylene-bis(trimethylsiloxy) methylvinylsilane*

| Run | Percent by weight of bis-(trimethylsiloxy)-methylvinylsilane in reaction mixture | Percent by weight of combined bis(trimethylsiloxy) methylvinylsilane in copolymer | M.P. (° C.) |
|---|---|---|---|
| 1 | 10 | 56.6 | 140 |
| 2 | 23.5 | 75.1 | 142 |
| 3 | 33.4 | 73.4 | |
| 4 | 47.6 | 78.7 | 135 |
| 5 | 90.0 | 82.9 | |

These copolymers were all soluble in benzene and isoproply alcohol.

EXAMPLE III

Into a polymerization-type Pyrex tube, cooled in a Dry Ice-acetone bath and previously flushed with argon, were placed tris(trimethylsiloxy)vinylsilane (0.5 gram), freshly distilled chlorotrifluoroethylene (45.0 grams) and acetyl peroxide (0.5 gram as a 25% solution in dimethylphthalate). The tube was sealed under argon and rotated in a water bath at 60°±2° C. for a period of 24 hours. Copolymerization occurred as evidenced by the formation of solid material. The copolymer so produced was removed from the tube and washed with an isopropyl alcohol (250 cc.)-water (25 cc.) mixture. It was then dried overnight at 65° in a constant temperature oven. Analysis showed that the dried copolymer contained 22.1 percent by weight chlorine, corresponding to 72.5 percent by weight halocarbon. Similar runs were carried out using 0.5%, 0.2% and 0.05% by weight of tris(trimethylsiloxy)vinylsilane in the reaction mixture.

| Run | Percent by weight of tris(trimethylsiloxy)vinylsilane in reaction mixture | Percent by weight of combined halocarbon in copolymer |
| --- | --- | --- |
| 1 | 1.0 | 72.5 |
| 2 | 0.5 | 84.0 |
| 3 | 0.2 | 93.6 |
| 4 | 0.05 | 96.0 |

EXAMPLE IV

A sample of a chlorotrifluoroethylene-tris(trimethylsiloxy)vinylsilane copolymer (2.0 grams, containing 4.3% by weight siloxane) was dissolved in chloroform (30 cc.). To this solution were added 10 grams of octamethylcyclotetrasiloxane and 5% by weight of the mixture of sulfuric acid. The mixture was stirred for a period of 20 hours at room temperature. The acid was separated and the solvent was distilled off under reduced pressure. One weight percent of sulfuric acid was added, and the mixture was permitted to stand at room temperature for an additional 20 hours. The stiff, gel-like material so produced was dissolved in a petroleum ether-water mixture. This solution was washed with a sodium bicarbonate solution, and then dried over calcium chloride. Concentration of the dried solution gave a gummy gel-like residue. Analysis showed that this residue contained 1.49% chlorine, corresponding to 4.88% by weight halocarbon or 95.12% by weight siloxane. The large increase in the percent of the siloxane in the copolymer clearly showed that equilibration had taken place.

EXAMPLE V

A sample of a chlorotrifluoroethylene-tris(trimethylsiloxy)vinylsilane copolymer (5.0 grams, containing 93.6% by weight halocarbon), octamethylcyclotetrasiloxane (20.0 grams) and 2% sulfuric acid were mixed in a screw cap bottle and shaken at room temperature for 6 hours. The contents of the bottle formed a stiff gel. This material was dissolved in 200 cc. of chloroform and washed with saturated sodium bicarbonate solution followed by water until neutral. The chloroform solution was then dried over calcium chloride. The chloroform was removed under reduced pressure and the resulting residue stripped at 125° and 0.2 mm. Hg pressure for a period of 0.75 hours to remove any residual chloroform and unreacted cyclic tetramer. The resulting homogeneous oil weighed 13.63 grams. Analysis showed that the oil contained 7.5% by weight chlorine, corresponding to 24.6% by weight halocarbon or 75.4% by weight siloxane. The large increase in the percent of the siloxane in the copolymer clearly showed that equilibration had taken place.

What is claimed is:

1. A copolymer of chlorotrifluoroethylene and a mono-vinyl methylsiloxane, the molecules of said copolymer being composed of linear carbon chains wherein each of certain carbon atoms within the chain has two pendant hydrogen atoms, each of certain other carbon atoms within the chain has two pendant fluorine atoms, each of certain other carbon atoms within the chain has one pendant fluorine atom and one pendant chlorine atom, and each remaining carbon atom within the chain has one pendant hydrogen atom and one pendant methylsiloxane group.

2. A copolymer of chlorotrifluoroethylene and a mono-vinyl methylsiloxane which siloxane contains up to 7 silicon atoms, the molecules of said copolymer being composed of linear carbon chains wherein each of certain carbon atoms within the chain has two pendant hydrogen atoms, each of certain other carbon atoms within the chain has two pendant fluorine atoms, each of certain other carbon atoms within the chain has one pendant fluorine atom and one pendant chlorine atom, and each remaining carbon atom within the chain has one pendant hydrogen atom and one pendant methylsiloxane group containing up to 7 silicon atoms.

3. A copolymer of chlorotrifluoroethylene and trimethylsiloxydimethylvinylsilane, the molecules of said copolymer being composed of linear carbon chains wherein each of certain carbon atoms within the chain has two pendant hydrogen atoms, each of certain other carbon atoms within the chain has two pendant fluorine atoms, each of certain other carbon atoms within the chain has one pendant fluorine atom and one pendant chlorine atom, and each remaining carbon atom within the chain has one pendant hydrogen atom and one pendant trimethylsiloxydimethylsilyl group.

4. A copolymer of chlorotrifluoroethylene and bis-(trimethylsiloxy)methylvinylsilane, the molecules of said copolymer being composed of linear carbon chains wherein each of certain carbon atoms within the chain has two pendant hydrogen atoms, each of certain other carbon atoms within the chain has two pendant fluorine atoms, each of certain other carbon atoms within the chain has one pendant fluorine atom and one pendant chlorine atom, and each remaining carbon atom within the chain has one pendant hydrogen atom and one pendant bis(trimethylsiloxy)methylsilyl group.

5. A copolymer of chlorotrifluoroethylene and tris-(trimethylsiloxy)vinylsilane, the molecules of said copolymer being composed of linear carbon chains wherein each of certain carbon atoms within the chain has two pendant hydrogen atoms, each of certain other carbon atoms within the chain has two pendant fluorine atoms, each of certain other carbon atoms within the chain, has one pendant fluorine atom and one pendant chlorine atom, and each remaining carbon atom within the chain has one pendant hydrogen atom and one pendant tris(trimethylsiloxy)silyl group.

6. A copolymer of chlorotrifluoroethylene and a monovinyl siloxane, said siloxane having the graphical formula:

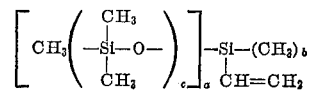

wherein:

(1) $a$, $b$ and $c$ are integers
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, the molecules of said copolymer being composed of linear carbon chains wherein each of certain carbon atoms within the chain has two pendant hydrogen atoms, each of certain other carbon atoms within the chain has two pendant fluorine atoms, each of certain other carbon atoms within the chain has one pendant fluorine atom and one pendant chlorine atom, and each remaining carbon atom within the chain has one pendant hydrogen atom and one pendant methylsiloxane group containing up to 7 silicon atoms.

7. A process for producing a copolymer composed of carbon chains having pendant halogen and hydrogen atoms and methylsiloxane groups, comprising forming a mixture of chlorotrifluoroethylene, a mono-vinyl siloxane and a vinyl polymerization catalyst, said mono-vinyl siloxane having the graphical formula

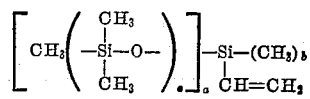

wherein:
(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, and heating the mixture to a temperature sufficiently elevated to cause the siloxane and chlorotrifluoroethylene to react to produce the copolymer.

8. A process for producing a copolymer composed of carbon chains having pendant halogen and hydrogen atoms and methylsiloxane groups, comprising forming a mixture of chlorotrifluoroethylene, a mono-vinyl siloxane and a vinyl polymerization catalyst, said mixture containing said siloxane in an amount of from about 5% to about 90% by weight of the total weight of said siloxane and said chlorotrifluoroethylene, said mono-vinyl siloxane having the graphical formula:

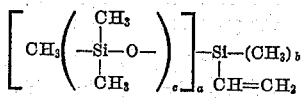

wherein:
(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, and heating the mixture to a temperature sufficiently elevated to cause the siloxane and chlorotrifluoroethylene to react to produce the copolymer.

9. A process as defined in claim 7, wherein said mono-vinyl siloxane is trimethylsiloxydimethylvinylsilane.

10. A process as defined in claim 8, wherein said mono-vinyl siloxane is trimethylsiloxydimethylvinylsilane.

11. A process as defined in claim 7, wherein said mono-vinyl siloxane is bis(trimethylsiloxy)methylvinylsilane.

12. A process as defined in claim 8, wherein said mono-vinyl siloxane is bis(trimethylsiloxy)methyvinylsilane.

13. A process as defined in claim 7, wherein said mono-vinyl siloxane is tris(trimethylsiloxy)vinylsilane.

14. A process as defined in claim 8, wherein said mono-vinyl siloxane is tris(trimethylsiloxy)vinylsilane.

15. A process for producing a copolymer composed of carbon chains having pendant halogen and hydrogen atoms and methylsiloxane groups, comprising forming a mixture of chlorotrifluoroethylene, a mono-vinyl siloxane and a vinyl polymerization catalyst, said mono-vinyl siloxane having the graphical formula

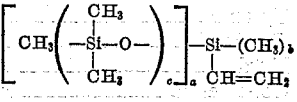

wherein:
(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, and heating the mixture to a temperature sufficiently elevated to cause the siloxane and chlorotrifluoroethylene to react to produce a copolymer; and increasing the siloxane content of said copolymer by equilibrating said copolymer with a methylpolysiloxane containing more than two consecutive silicon to oxygen to silicon bonds, said equilibration being conducted by heating the copolymer and the methylpolysiloxane in the presence of an equilibration catalyst selected from the group consisting of acidic and basic cathalysts to a temperature sufficiently elevated to cause the copolymer and the methylpolysiloxane to react to produce an equilibrated copolymer having a greater siloxane content than the unequilibrated copolymer initially produced.

16. A process for producing a copolymer composed of carbon chains having pendant halogen and hydrogen atoms and methylsiloxane groups, comprising forming a mixture of chlorotrifluoroethylene, a mono-vinyl siloxane and a vinyl polymerization catalyst, said mixture containing said siloxane in an amount of from about 1% to about 60% by weight of the total weight of said siloxane and said chlorotrifluoroethylene, said mono-vinyl siloxane having the graphical formula

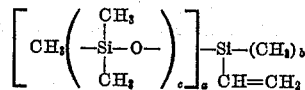

wherein:
(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, and heating the mixture to a temperature sufficiently elevated to cause the siloxane and chlorotrifluoroethylene to react to produce a copolymer; and increasing the siloxane content of said copolymer by equilibrating said copolymer with a methylpolysiloxane containing more than two consecutive silicon to oxygen to silicon bonds, said equilibration being conducted by heating the copolymer and the methylpolysiloxane in the presence of an equilibration catalyst selected from the group consisting of acidic and basic catalysts to a temperature sufficiently elevated to cause the copolymer and the methylopolysiloxane to react to produce an equilibrated copolymer having a greater siloxane content than the unequilibrated copolymer initially produced.

17. A process for producing a copolymer composed of carbon chains having pendant halogen and hydrogen atoms and methyl-siloxane groups, comprising forming a mixture of chlorotrifluoroethylene, a mono-vinyl siloxane and a vinyl polymerization catalyst, said mixture containing said siloxane in an amount of from about 1% to about 99% by weight of the total weight of said siloxane and said chlorotrifluoroethylene, said mono-vinyl siloxane having the graphical formula

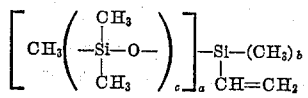

wherein:
(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, and heating the mixture to a temperature sufficiently elevated to cause the siloxane and chlorotrifluoroethylene to react to produce the copolymer.

18. A process for producing a copolymer composed of carbon chains having pendant halogen and hydrogen atoms and methylsiloxane groups, comprising forming a mixture of chlorotrifluoroethylene, a mono-vinyl siloxane and a vinyl polymerization catalyst, said mixture containing said siloxane in an amount of from about 1% to about 99% by weight of the total weight of said siloxane and said chlorotrifluoroethylene, said mono-vinyl siloxane having the graphical formula

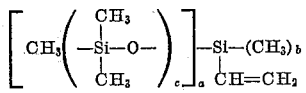

wherein:
(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, and heating the mixture to a temperature of from about 30° C. to about 150° C. to cause the siloxane and chlorotrifluoroethylene to react to produce the copolymer.

19. A process for producing a copolymer composed of carbon chains having pendant halogen and hydrogen atoms and methylsiloxane groups, comprising forming a mixture of chlorotrifluoroethylene, a mono-vinyl siloxane and a vinyl polymerization catalyst, said mixture containing said siloxane in an amount of from about 1% to about 99% by weight of the total weight of said siloxane and said chlorotrifluoroethylene, said mono-vinyl siloxane having the graphical formula

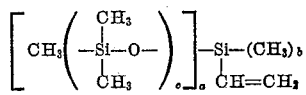

wherein:
(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, and heating the mixture to a temperature of from about 50° C. to about 80° C. to cause the siloxane and chlorotrifluoroethylene to react to produce the copolymer.

20. A process for producing a copolymer composed of carbon chains having pendant halogen and hydrogen atoms and methylsiloxane groups, comprising forming a mixture of chlorotrifluoroethylene, a mono-vinyl siloxane and a vinyl polymerization catalyst, said mixture containing said siloxane in an amount of from about 1% to about 60% by weight of the total weight of said siloxane and said chlorotrifluoroethylene, said mono-vinyl siloxane having the graphical formula

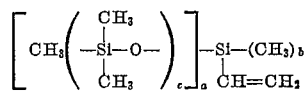

wherein:
(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, and heating the mixture to a temperature of from about 30° C. to about 150° C. to cause the siloxane and chlorotrifluoroethylene to react to produce a copolymer; and increasing the siloxane content of said copolymer by equilibrating said copolymer with a methylpolysiloxane containing more than two consecutive silicon to oxygen to silicon bonds, said equilibration being conducted by heating the copolymer and the methylpolysiloxane in the presence of an equilibration catalyst selected from the group consisting of acidic and basic catalysts to a temperature sufficiently elevated to cause the copolymer and the methylpolysiloxane to react to produce an equilibrated copolymer having a greater siloxane content than the unequilibrated copolymer initially produced.

21. A process for producing a copolymer composed of carbon chains having pendant halogen and hydrogen atoms and methylsiloxane groups, comprising forming a mixture of chlorotrifluoroethylene, a mono-vinyl siloxane and a vinyl polymerization catalyst, said mixture containing said siloxane in an amount of from about 1% to about 60% by weight of the total weight of said siloxane and said chlorotrifluoroethylene, said mono-vinyl siloxane having the graphical formula

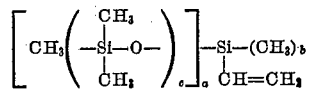

wherein:
(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, and heating the mixture to a temperature of from about 50° C. to about 80° C. to cause the siloxane and chlorotrifluoroethylene to react to produce a copolymer; and increasing the siloxane content of said copolymer by equilibrating said copolymer with a methylpolysiloxane containing more than two consecutive silicon to oxygen to silicon bonds, said equilibration being conducted by heating the copolymer and the methylpolysiloxane in the presence of an equilibration catalyst selected from the group consisting of acidic and basic catalysts to a temperature sufficiently elevated to cause the copolymer and the methylpolysiloxane to react to produce an equilibrated copolymer having a greater siloxane content than the unequilibrated copolymer initially produced.

References Cited in the file of this patent

UNITED STATES PATENTS

| | | |
|---|---|---|
| 2,443,353 | Hyde et al. | June 15, 1948 |
| 2,507,519 | Goodwin | May 16, 1950 |
| 2,532,583 | Tyran | Dec. 5, 1950 |
| 2,550,003 | Daudt | Apr. 24, 1951 |
| 2,645,628 | Hurd | July 14, 1953 |
| 2,716,638 | Cohen et al. | Aug. 30, 1955 |
| 2,756,246 | Burkhard | July 24, 1956 |

FOREIGN PATENTS

| | | |
|---|---|---|
| 766,528 | Great Britain | Jan. 23, 1957 |
| 1,116,316 | France | Jan. 30, 1956 |

OTHER REFERENCES

Burkhard II: Abstract of S.N. 111,091, filed Aug. 13, 1949, 663 O.G. 571.

UNITED STATES PATENT OFFICE

CERTIFICATE OF CORRECTION

Patent No. 2,909,548            October 20, 1959

Donald L. Bailey et al.

It is hereby certified that error appears in the printed specification of the above numbered patent requiring correction and that the said Letters Patent should read as corrected below.

Column 5, line 17, the second formula from the top, after the first closing bracket, for the indistinct letter at the bottom thereof read -- v --; column 10, line 3, for "cathalysts" read -- catalysts --; line 42, for "methylopolysiloxane" read -- methylpolysiloxane --.

Signed and sealed this 2nd day of August 1960.

(SEAL)
Attest:

KARL H. AXLINE            ROBERT C. WATSON
Attesting Officer            Commissioner of Patents